(12) United States Patent
Kupisiewicz et al.

(10) Patent No.: US 10,972,434 B2
(45) Date of Patent: Apr. 6, 2021

(54) PROXY-BASED CLIENTLESS VPN WITH WEB BROWSER PROXY AUTO-CONFIGURATION (PAC) FILE AND EXTENSION

(71) Applicant: Cisco Technology, Inc., San Jose, CA (US)

(72) Inventors: Piotr Jerzy Kupisiewicz, Cracow (PL); Frederic Detienne, Harze (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 213 days.

(21) Appl. No.: 16/124,233

(22) Filed: Sep. 7, 2018

(65) Prior Publication Data
US 2019/0386961 A1 Dec. 19, 2019

Related U.S. Application Data

(60) Provisional application No. 62/686,783, filed on Jun. 19, 2018.

(51) Int. Cl.
*H04L 29/06* (2006.01)
*H04L 29/12* (2006.01)
(Continued)

(52) U.S. Cl.
CPC ...... *H04L 63/0272* (2013.01); *H04L 12/4641* (2013.01); *H04L 61/1511* (2013.01);
(Continued)

(58) Field of Classification Search
CPC ............. H04L 63/0272; H04L 63/0281; H04L 12/4641; H04L 61/1511; H04L 61/2007; H04L 67/02
See application file for complete search history.

(56) References Cited

U.S. PATENT DOCUMENTS 8,667,146 B2 3/2014 Agarwal et al.
9,191,777 B2 11/2015 Thomas et al.
(Continued)

OTHER PUBLICATIONS

"Basic Clientless SSL VPN Configuration", Cisco ASA Series VPN CLI Configuration Guide, Chapter 15, Sep. 13, 2013, 30 pages.

*Primary Examiner* — Sarah Su
(74) *Attorney, Agent, or Firm* — Edell, Shapiro & Finnan, LLC

(57) ABSTRACT

A security gateway security gateway provisions a web browser hosted on a user device with a proxy auto-configuration file configured to automatically redirect the web browser to the security gateway as a proxy server for clientless virtual private network (VPN) operation when the web browser browses any uniform resource locator including a particular domain name that encompasses a private network. Upon receiving from the web browser over a public network a request to access a private resource on the private network, the security gateway establishes a secure public connection to the web browser, establishes a private connection to the private resource, and associate the private connection with the secure public connection to form a clientless VPN connection between the web browser and the private resource. The security gateway forwards content between the private resource and the web browser over the clientless VPN connection without performing any content rewrite operations.

20 Claims, 15 Drawing Sheets

(51) Int. Cl.
*H04L 29/08* (2006.01)
*H04L 12/46* (2006.01)

(52) U.S. Cl.
CPC ...... *H04L 61/2007* (2013.01); *H04L 63/0281* (2013.01); *H04L 67/02* (2013.01)

(56) References Cited

U.S. PATENT DOCUMENTS

| | | |
|---|---|---|
| 9,203,810 B2 | 12/2015 | Gorodyansky |
| 2006/0037071 A1* | 2/2006 | Rao .................. H04L 45/00 726/13 |
| 2009/0089874 A1* | 4/2009 | Mohanty ............ H04L 12/4641 726/15 |
| 2009/0193513 A1* | 7/2009 | Agarwal .............. H04L 63/166 726/15 |
| 2016/0094539 A1* | 3/2016 | Suresh ................. H04L 67/40 726/7 |
| 2017/0331789 A1* | 11/2017 | Kumar ............... H04L 63/0281 |
| 2019/0238504 A1* | 8/2019 | Gupta ................. H04L 63/029 |
| 2020/0204551 A1* | 6/2020 | Singh ................ H04L 67/1002 |
| 2020/0336484 A1* | 10/2020 | Mahajan ............. H04L 67/125 |

* cited by examiner

US 10,972,434 B2

PROXY-BASED CLIENTLESS VPN WITH WEB BROWSER PROXY AUTO-CONFIGURATION (PAC) FILE AND EXTENSION

PRIORITY CLAIM

This application claims priority to U.S. Provisional Application No. 62/686,783, filed Jun. 19, 2018, the entirety of which is incorporated herein by reference.

TECHNICAL FIELD

The present disclosure relates to clientless virtual private network (VPN) solutions.

BACKGROUND

Conventional clientless VPN solutions include a user device that accesses a private network through a proxy, such as a security gateway. In the conventional solution, the security gateway performs "HTML rewrite" or "HTTP rewrite" of web pages and JavaScript content exchanged between the private network and the user device in order to maintain transparency of the security gateway. The rewrite process is complicated and can result in errors.

DESCRIPTION OF EXAMPLE EMBODIMENTS

Overview

Figure 1:
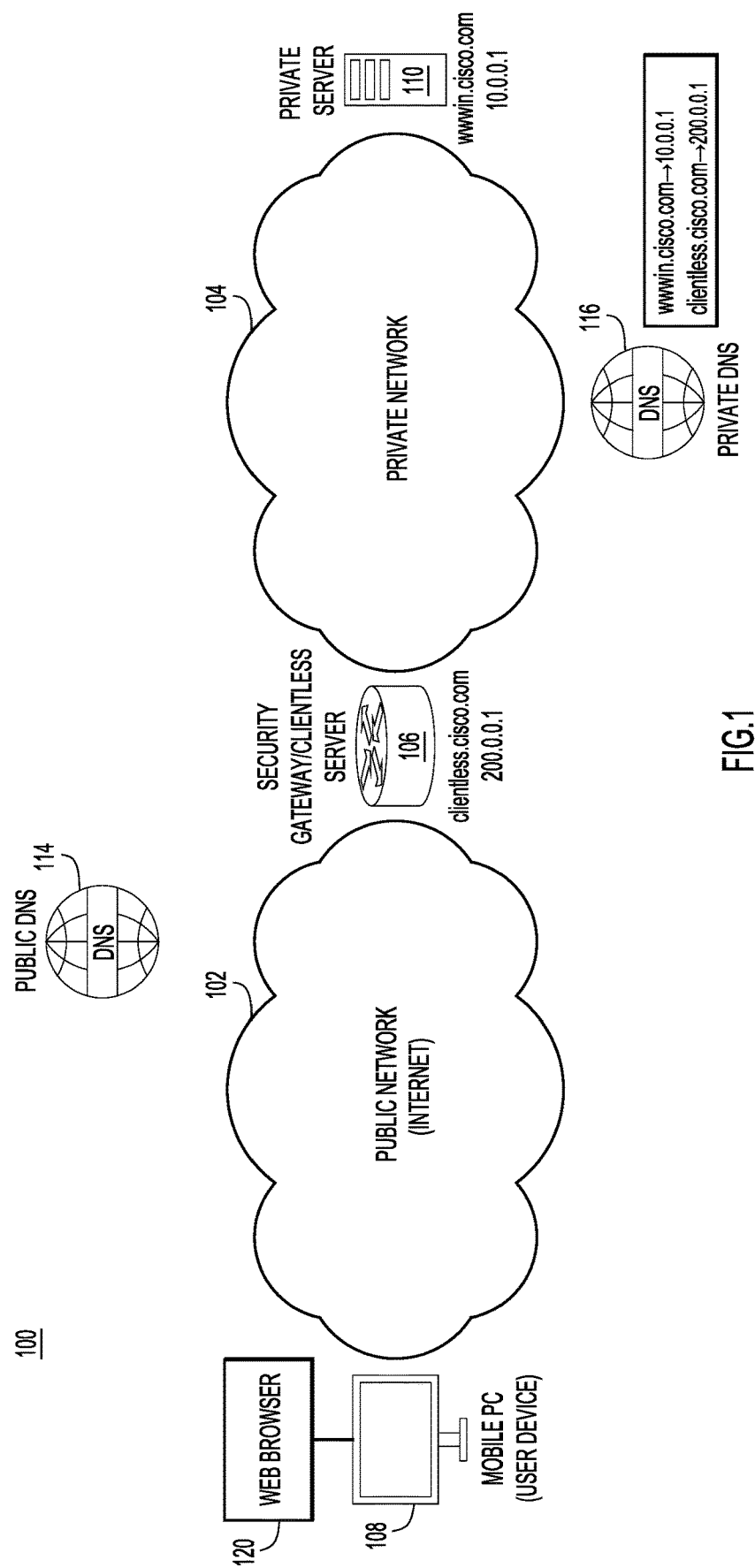
FIG. 1 is an illustration of a network environment in which Domain Name System (DNS)-based clientless VPN embodiments may be implemented, according to an example embodiment.

In one embodiment, a security gateway configured to communicate with a public network and a private network performs a method. The method includes provisioning, over the public network, a web browser hosted on a user device with a proxy auto-configuration file configured to automatically redirect the web browser to the security gateway as a proxy server for clientless virtual private network (VPN) operation when the web browser browses any uniform resource locator including a particular domain name that encompasses the private network. The method further includes, upon receiving from the web browser over the public network a request to access a private resource on the private network, establishing a secure public connection to the web browser over the public network, establishing a private connection to the private resource over the private network, and associating the private connection with the secure public connection to form a clientless VPN connection between the web browser and the private resource. The method also includes forwarding content between the private resource and the web browser over the clientless VPN connection without performing any content rewrite operations.

Example Embodiments

VPNs—Virtual Private Networks—is a technology commonly used to connect a remote user device to a private (enterprise) network, so that a user of the user device can work remotely. Ideally the user experience of working remotely should be no different than the experience of working locally. Clientless VPN aims to provide the user with a simple-to-use method of accessing the private network for basic services. In clientless VPN, the user device does not host a VPN client application (referred to as a "VPN client"); however, the user device may host a relatively small clientless application to assist with making a secure connection to the private network, but it is expected that user actions are kept to a minimum.

For ease of use, clientless VPN should not require the user to perform specific/particular VPN-related user actions to establish secure connectivity each time such connectivity is required. Rather, it is desirable that the user simply "browse" to a target URL and then receive an authentication prompt for authentication information. The user should then be granted access to a secure connection upon entering appropriate authentication information.

Conventional clientless VPN technology focuses on making the secure connection between the user device (web browser) and the private network through a "transparent" proxy that is transparent to the web browser and the user. Unfortunately, this leads to what is called "HTML rewrite" or "HTTP rewrite" at the proxy. That is, the proxy converts the HTML and JavaScript content of web pages flowing between the private network and the web browser through the proxy. The rewrite process is complex and fragile, which results in errors. Thus, some in the industry refer to the rewrite as "HTML mangling."

Embodiments presented below are directed to a clientless VPN solution that avoids the above-mentioned problems and offers other advantages over conventional clientless VPN techniques.

FIG. 1 is an illustration of a network environment 100 in which Domain Name System (DNS)-based clientless VPN embodiments may be implemented. The network environment 100 includes a public network 102, such as the Internet, and a private network 104, such as a private enterprise network. The network environment 100 also includes a security gateway 106 connected to both the public network 102 and the private network 104, a user device or endpoint device 108 (shown as a mobile personal computer (PC)) connected to the public network, and a private server 110 (or any other private resource) connected to the private network. The security gateway 106 may be a network device such as a router, or a server device referred to as a "clientless server." In the ensuing description, the "security gateway" is construed broadly to cover either implementation. The network environment 100 also includes a public DNS service 114 accessible to all of the aforementioned network components and a private DNS service 116 accessible to the security gateway 106 and the private server 110, but not the user device 108. In the example of FIG. 1, the security gateway 106 is identified with a Uniform Resource Locator (URL) "clientless.cisco.com" associated with an Internet Protocol (IP) address 200.0.0.1, and the private server 110 is identified by a URL "wwwin.cisco.com" associated with an IP address 10.0.0.1. The user device 108 hosts a web browser 120, such as Firefox, Chrome, or the like, with which a user interacts to access the public network 102, and also to establish a clientless VPN connection with the private server 110 through the security gateway 106 and the private network 104, according to embodiments presented herein.

Figure 14:
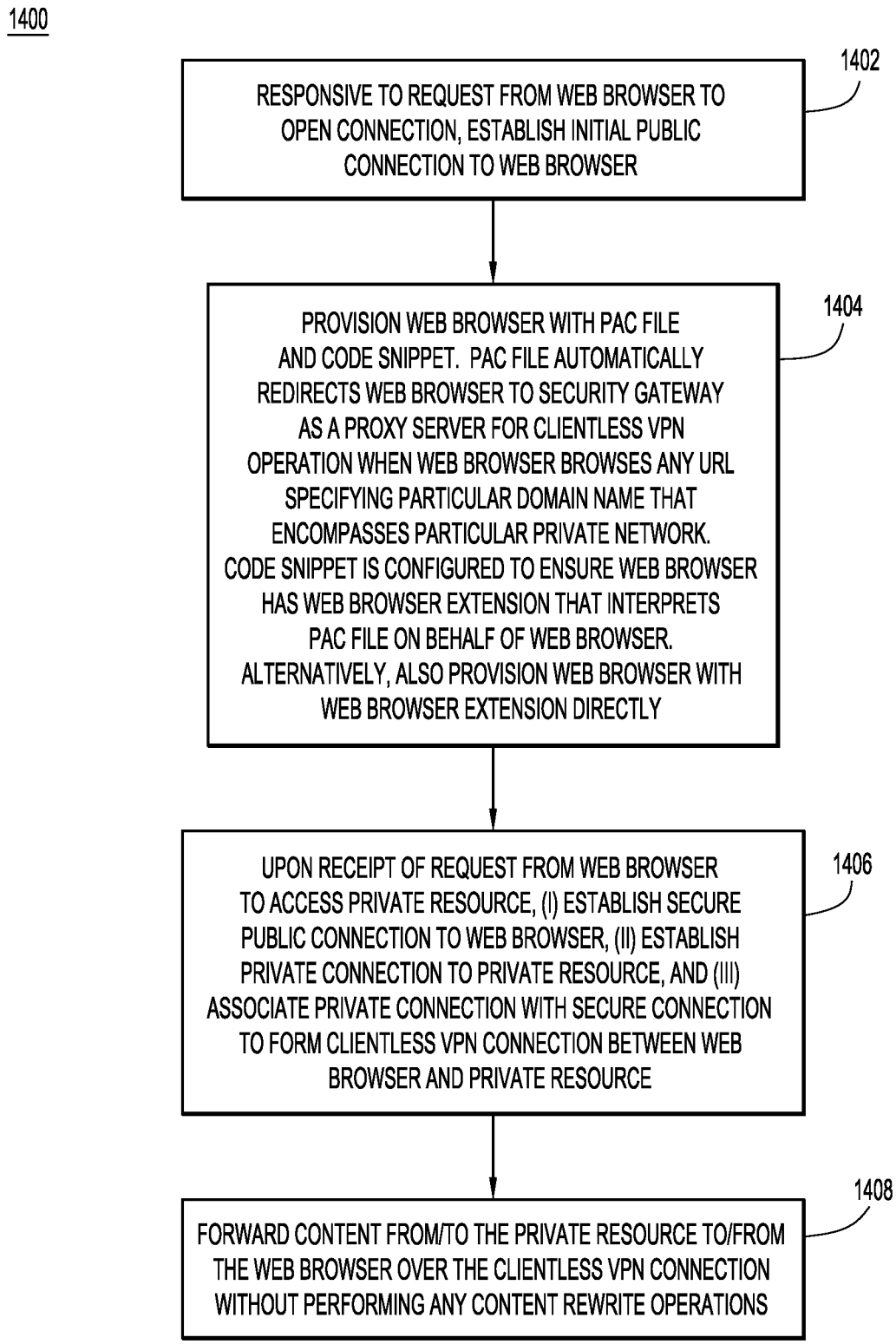
FIG. 14 is a flowchart of a method of clientless VPN operation performed by the security gateway, according to an example embodiment.
Figure 15:
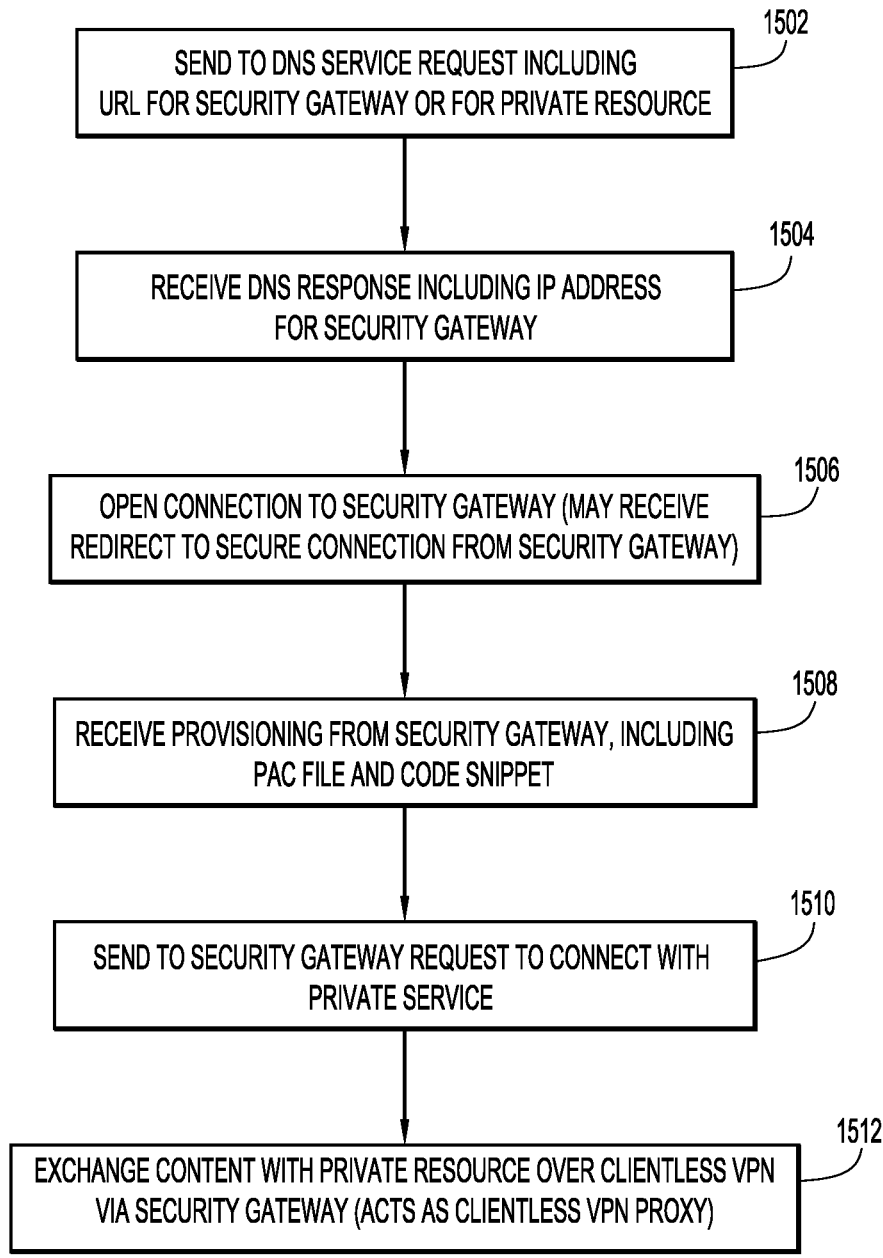
FIG. 15 is a flowchart of a method of clientless VPN operation performed by the user device, according to an example embodiment.

Methods of preparing (i.e., provisioning) for a clientless VPN connection and then establishing the clientless VPN connection in the network environment 100 are described below. First, the provisioning is described in connection with FIG. 2-6, then the establishing is described in connection with FIGS. 7 and 8. FIGS. 14 and 15 present flowcharts of methods performed by the security gateway 106 and the user device 108, respectively, that include various operations described herein.

The provisioning includes establishing an initial connection between the user device 108 and the security gateway 106. Establishing the initial connection may be performed using either of two approaches described below, i.e., option 1 or option 2, although other approaches may be used.

Figure 2:
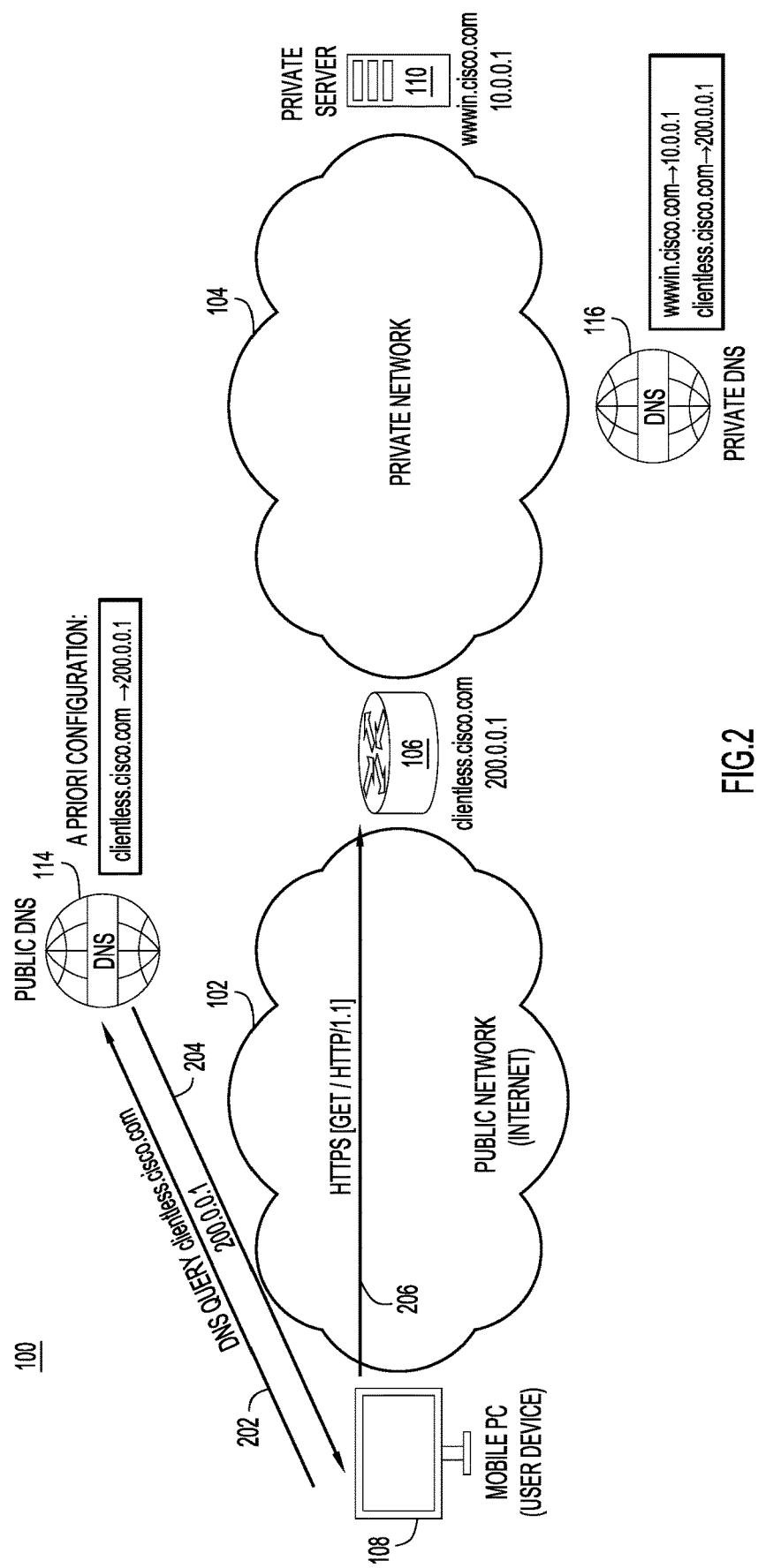
FIG. 2 is an illustration of a first option of opening an initial connection between a user device and a security gateway of the network environment in order to provision the user device for clientless VPN operation, according to an example embodiment.

With reference to FIG. 2, option 1 is described first. A priori, an administrator publishes to the public DNS service 114 URL "clientless.cisco.com" and its associated public IP address 200.0.0.1 for the security gateway 106. The user of the user device 108 is instructed by the administrator to browse URL "clientless.cisco.com" for the security gateway 106 using the web browser 120 hosted on the user device 108. At 202, responsive to the user entering the URL "clientless.cisco.com" into the web browser 120, the web browser submits to the public DNS service 114 a DNS query for the associated IP address. At 204, the public DNS service 114 returns to the user device 108 IP address 200.0.0.1 for the security gateway 106. At 206, the web browser 120 opens a Hypertext Transfer Protocol Secure (HTTPS) client connection to "clientless.cisco.com." Once the initial connection has been opened, the clientless VPN provisioning proceeds, as described below.

Figure 3:
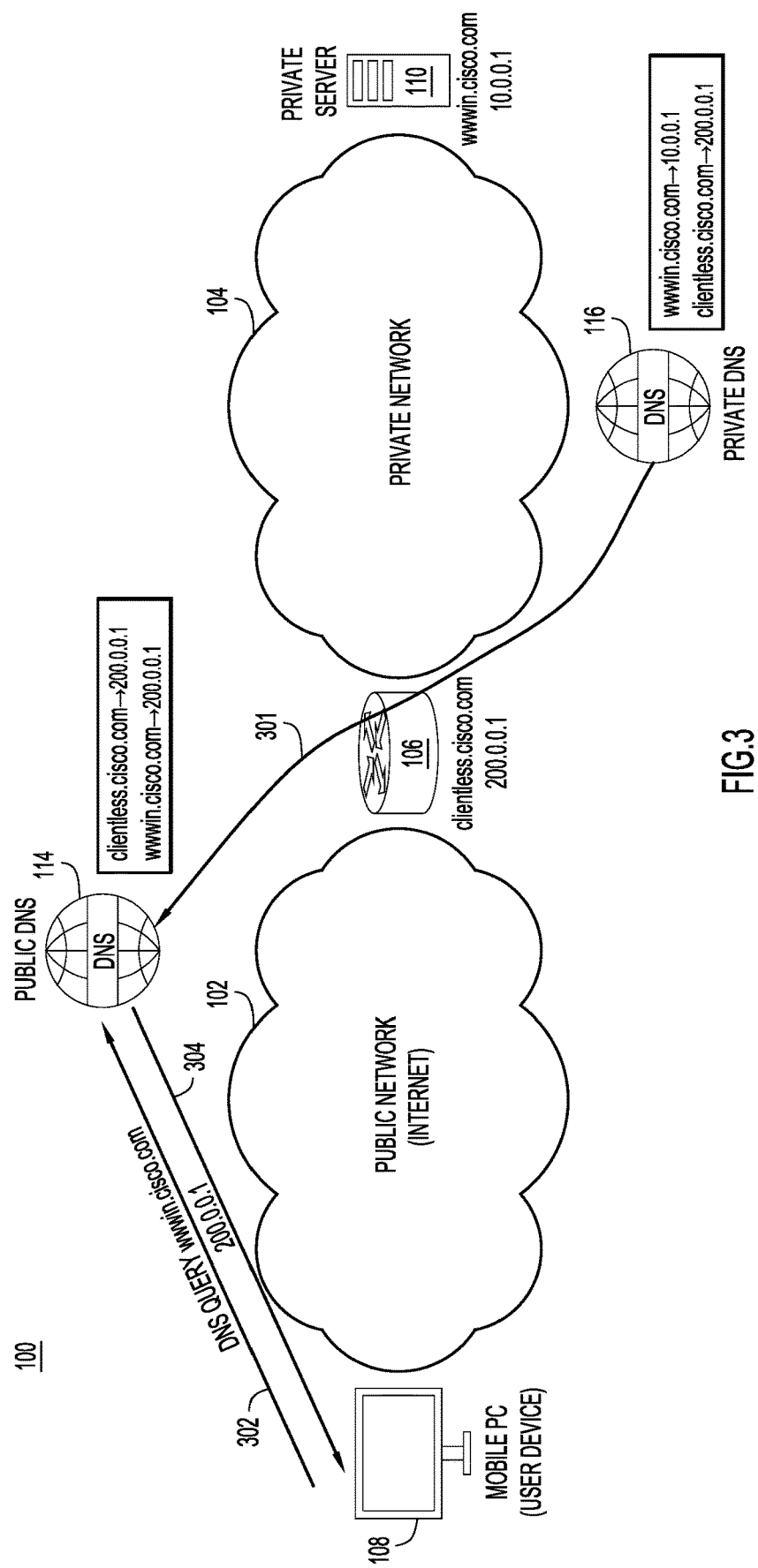
FIG. 3 is an illustration of a second option of opening an initial connection between the user device and the security gateway to provision the user device for clientless VPN operation, according to an example embodiment.
Figure 4:
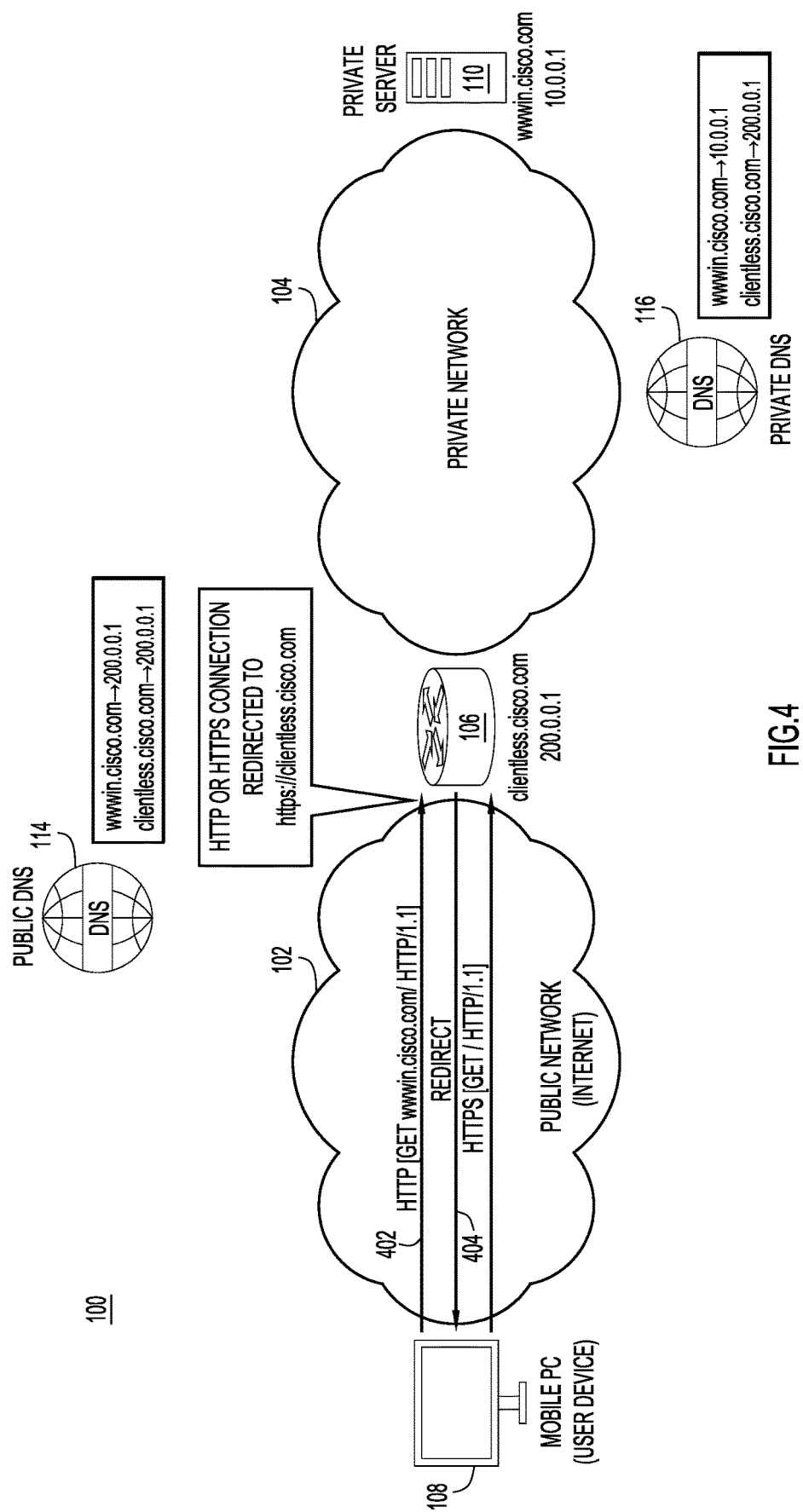
FIG. 4 is an illustration of a continuation of the second option of opening an initial connection between the user device and the security gateway to provision the user device for clientless VPN operation, according to an example embodiment.

With reference to FIGS. 3 and 4, option 2 is described next. Referring first to FIG. 3, a priori, at 301, the administrator publishes to the public DNS service 114 (i) URL "clientless.cisco.com" and its associated IP address 200.0.0.1 for the security gateway 106, and (ii) URL "wwwin.cisco.com" also with (i.e., mapped to) the IP address 200.0.0.1 for the security gateway 106. At 302, responsive to the user entering the URL "wwwin.cisco.com" into the web browser 120 (instead of "clientless.cisco.com" as in option 1), the web browser submits to the public DNS service 114 a DNS query for the associated IP address. At 304, the public DNS service 114 returns to the user device IP address 200.0.0.1 for the security gateway 106.

Turning to FIG. 4, at 402 the web browser opens either an HTTP or an HTTPS connection with the security gateway 106 (i.e., the target IP address 200.0.0.1 of the connection), depending on what command (URL) the web browser received from the user (e.g., the URL may be typed into the web browser, or received via a bookmark). At 404, upon receiving the request to open the connection at 402, the security gateway 106 returns to the web browser 120 a redirect to force an explicit connection to itself over HTTPS. This ensures that at the end of option 2, an HTTPS connection is always established between the user device 108 (i.e., web browser 120 hosted on the user device) and the security gateway 106.

Once the initial connection has been opened using option 1 or option 2 described above, the user device 108 is then provisioned for clientless VPN operation. At a high-level, to provision the user device 108, a relatively small web browser extension (for clientless software) is installed on the web browser. Also, a small configuration file for the web browser 120 is installed. The small configuration file includes a proxy auto-configuration (PAC) file. The PAC file defines how the web browser 120 automatically chooses the security gateway 106 (i.e., clientless.cisco.com) as an appropriate proxy server (access method) for fetching a given URL. Thus, the PAC file identifies a domain name specific proxy server. On the other hand, the web browser extension interprets the PAC file.

Figure 5:
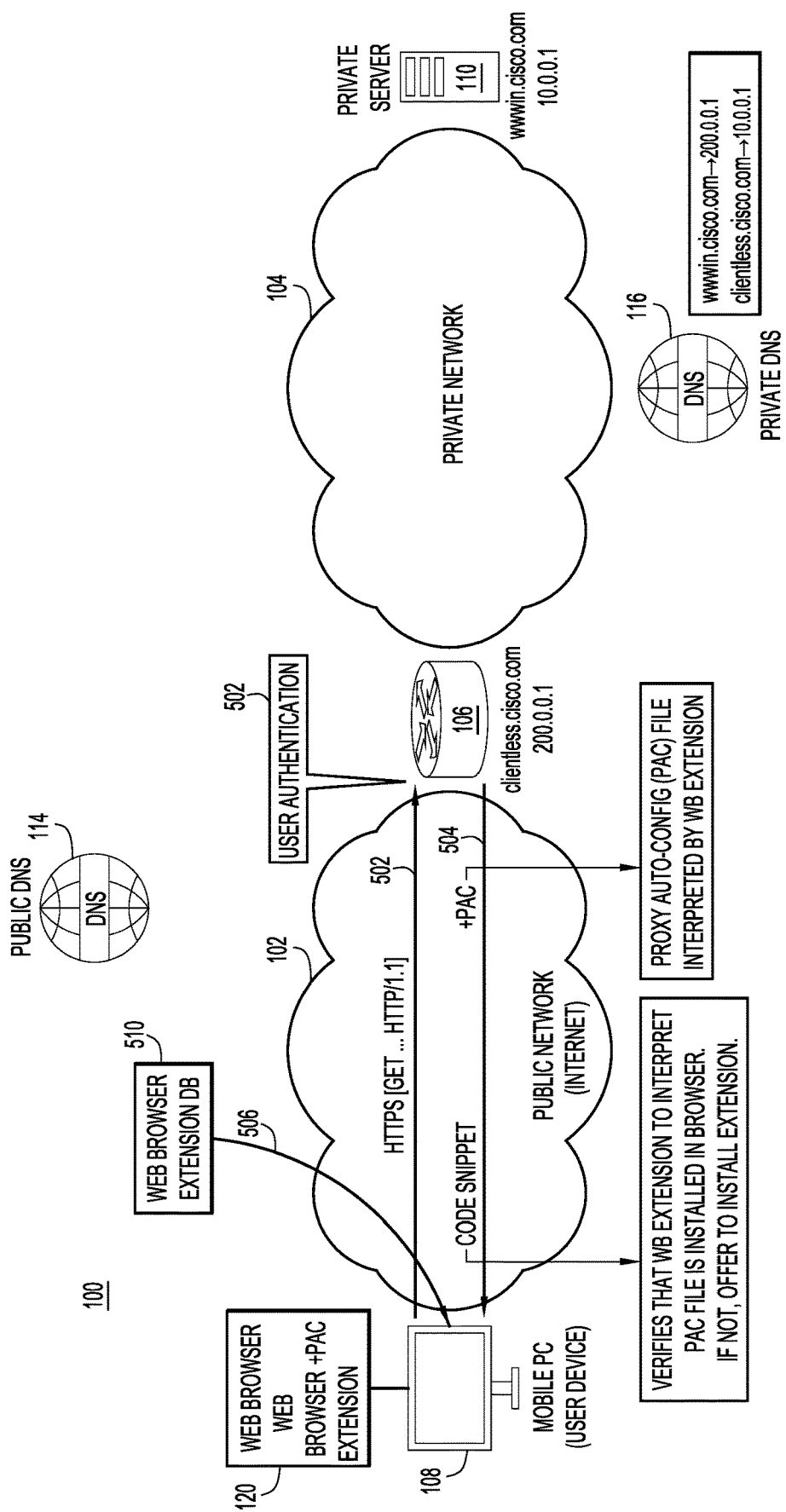
FIG. 5 is an illustration of a method of provisioning the user device for clientless VPN operation over the initial connection, including checking a readiness of the user device for clientless VPN operation, and downloading of files to the user device for clientless VPN operation, according to an example embodiment.
Figure 6:
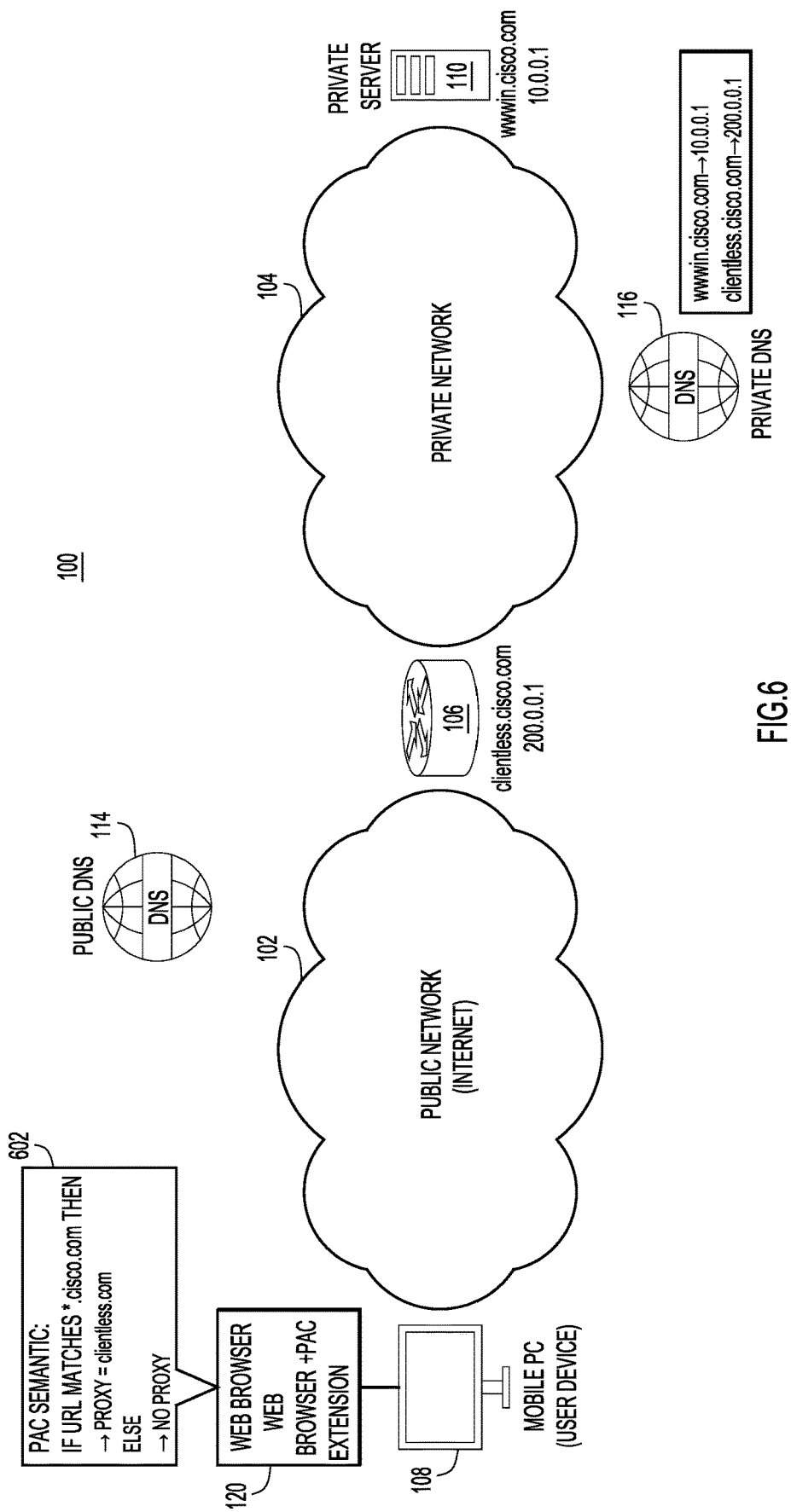
FIG. 6 is an illustration of a continuation of the method of FIG. 5, including an illustration of a proxy auto-configuration (PAC) file downloaded to the user device, according to an example embodiment.

The provisioning operation is described more fully in connection with FIGS. 5 and 6. With reference first to FIG. 5, at 502, the security gateway 106 authenticates the user of the user device 108, i.e., authenticates user credentials, such as a name and a password, entered into and received from the web browser 120. Once the user is authenticated, at 504, the security gateway 106 will return to the user device 108 an HTML document (referred to as a "code snippet") including JavaScript or HTML5, for example. The code snippet, when executed on the user device 108, causes the web browser (WB) 120 to check for the presence of the above-mentioned web browser extension, i.e., whether the web browser extension is installed on the web browser. Also, the security gateway 106 pushes the PAC file to the web browser 120. Conventional web browsers cannot understand/interpret or install the PAC file presented herein. Thus, the purpose of the web browser extension is to install the PAC file on web browser 120 and interpret the PAC file for/on behalf of the web browser. If the web browser extension is present, then both the extension and the PAC file are available to (i.e., installed on) the web browser.

At 506, if the web browser extension is not installed on the web browser 120, the code snippet presents the web browser 120 with an option for fetching/downloading the missing web browser extension from an external web browser extension database (DB) 510 hosted on a cloud-based extension server. For example, the code snippet provides to the web browser 120 the URLs to the web browser extension database 510, and causes the web browser to fetch/download the web browser extension based on the URLs, without manual intervention. Once fetched, the web browser extension is installed, and then the web browser extension installs, and is ready to interpret, the PAC file. Additionally, if a new version of the web browser extension is available, it will be published by its vendor to the web browser extension database 510, and the web browser 120 will be updated automatically. The web browser extension may be published to the web browser extension database 510 in signed form, which also avoids deployment complexity. Thus, acquiring the aforementioned provisioning files is automatic and does not require intervention of either the administrator or the user.

With reference to FIG. 6, there is an illustration of an example PAC file 602 installed into the web browser 120. The PAC file makes reference to an input "URL." That input URL would normally be entered into the web browser 120 by the user, retrieved from a bookmark, and so on. All such actions are referred to more generally as "browsing the URL." The PAC file, when executed by the web browser 120, operates as follows. If the URL matches a particular domain name, i.e., a domain name of interest to the administrator (e.g., if the URL=*.cisco), then the web browser 120 is instructed to explicitly use "clientless.cisco.com" as a proxy server. Otherwise, the web browser 120 is not specified.

The extension may also manage multiple PAC files, and allow the user to use a respective dedicated server for each of multiple domain names, such as *.cisco, *.IBM, and so on.

Once the web browser 120 has been provisioned as described above, the web browser 120 may establish a secure clientless connection with the private network 104 as described in connection with FIGS. 7 and 8.

Figure 7:
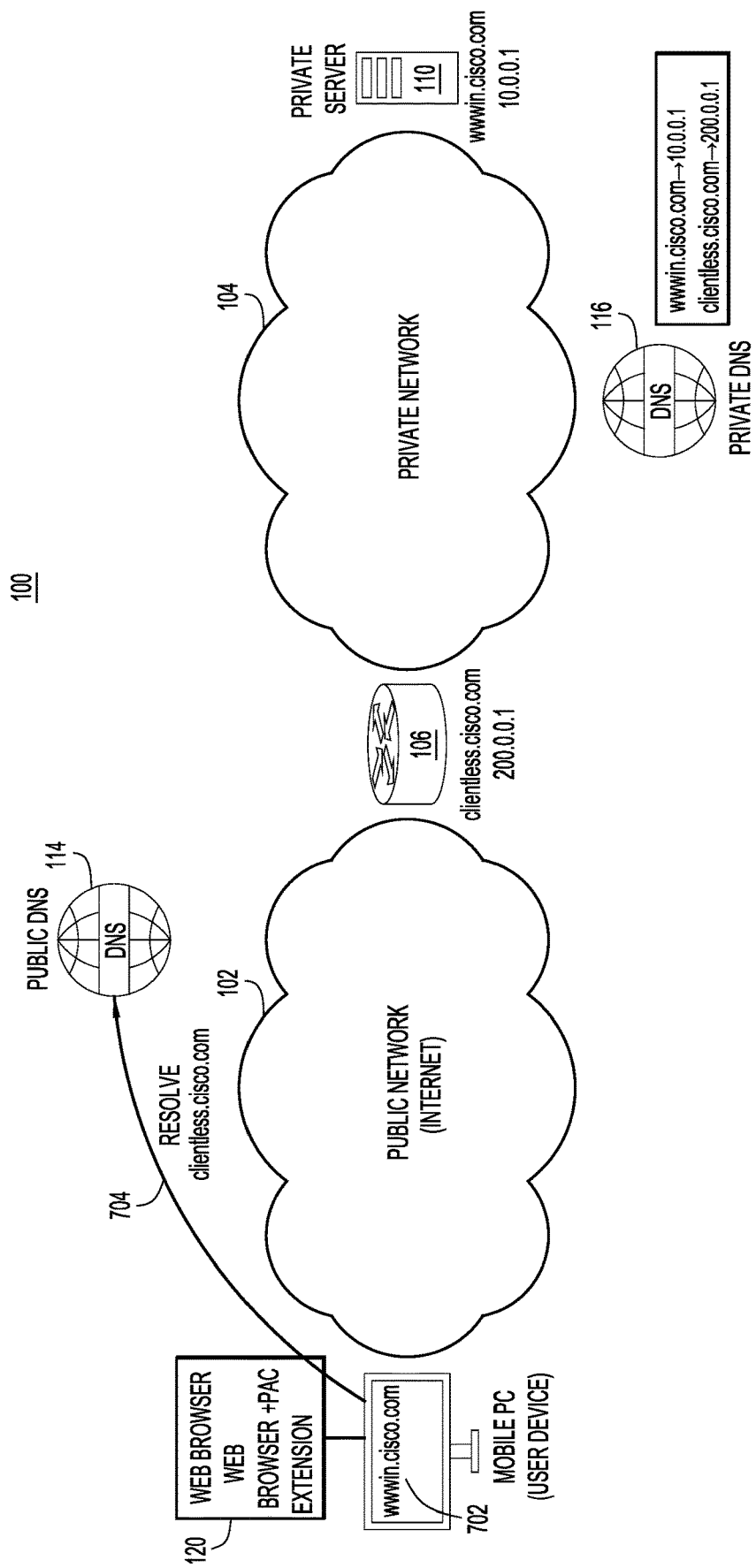
FIG. 7 is an illustration of a method of establishing a clientless connection between the user device and a private network, including resolving a Uniform Resource Locator (URL) of the security gateway at a web browser hosted on the user device, according to an example embodiment.

With reference to FIG. 7, at 702, the user browses "wwwin.cisco.com." For example, the user enters the URL into the web browser URL entry bar. At 704, the web browser 120 resolves the URL "wwwin.cisco.com" because it matches the domain name of interest given in the PAC file.

Figure 8:
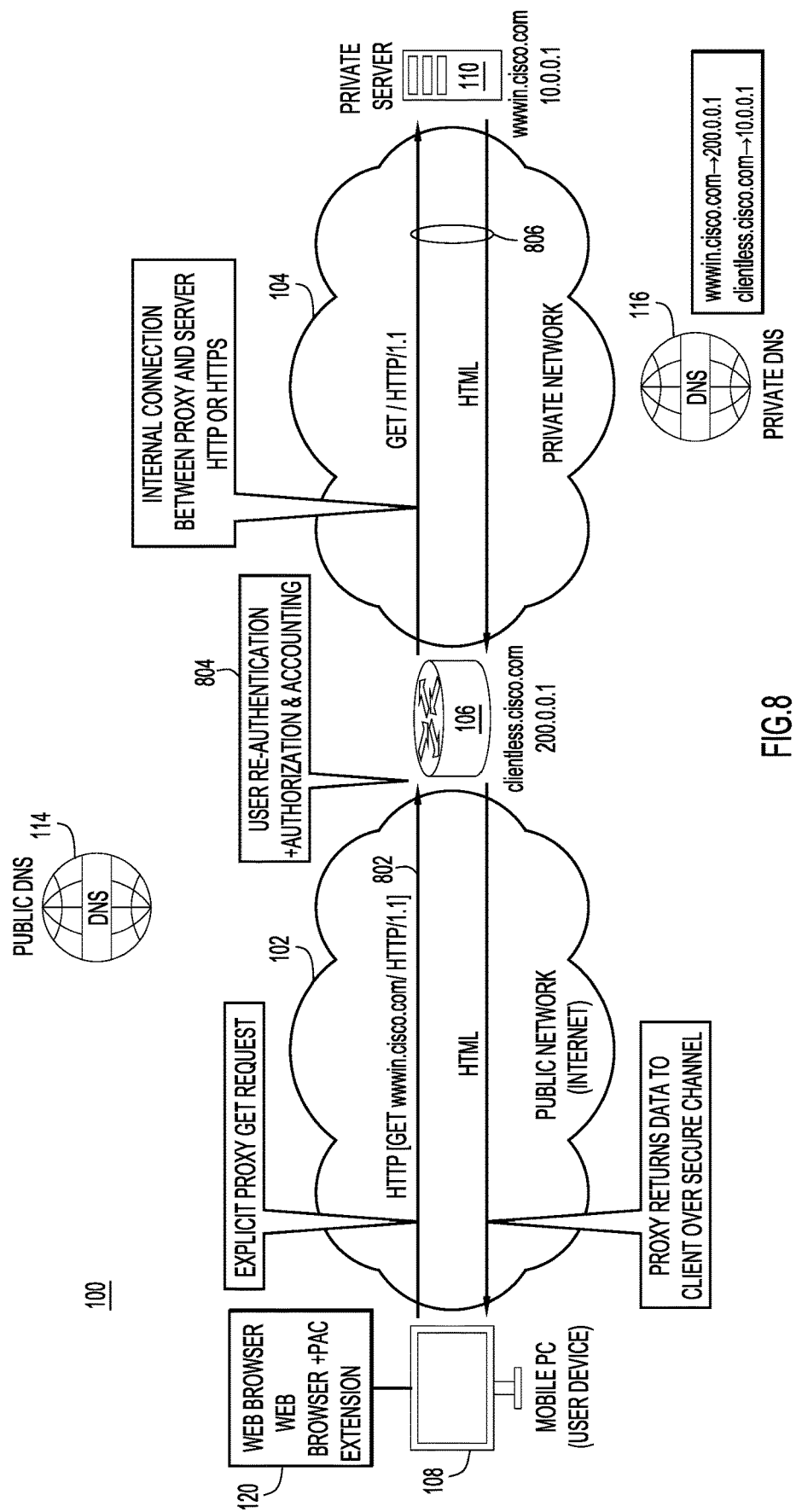
FIG. 8 is an illustration of a continuation of the method of FIG. 7, including finalizing the clientless connection, according to an example embodiment.

Turning to FIG. 8, at 802, the web browser 120 establishes an HTTP or HTTPS connection to the security gateway 106 "wwwin.cisco.com." At 804, the security gateway 106 may authenticate or re-authenticate the user depending on whether Transport Layer Security (TLS) resumption or more frequent re-authorization is desired. All traditional security policies may apply. Also, other authorization and accounting checks may be made.

Responsive to establishment of the HTTP or HTTPS connection at 802, at 806, the security gateway 106 establishes a connection to the private server 110 identified as "wwwin.cisco.com" and associates that connection to the HTTP or HTTPS connection with the user device 108 established at 802. Because this is an explicit proxy connection, for content (e.g., HTML/JavaScript) passing from the private server 110 "wwwin.cisco.com" to the user device 108 over the private network connection and the public network connection, there is no need for any content (e.g., HTML/JavaScript) rewrite at the security gateway 106. That is, the web browser 120 knows that there is an entity (the proxy security gateway 106) between the web browser 120 and the private server 110. This is because the security gateway 106 has advertised its presence to the web browser 120, the web browser 120 knows that the security gateway 106 is performing a proxy service, and there is, therefore, no need for HTML rewrite that is performed conventionally. Accordingly, when the security gateway 106 receives HTML/JavaScript content from the private server 110 that is destined for the user device 108, the security gateway 106 simply encapsulates the content for transport over the HTTP or HTTPS connection, and sends the encapsulated content to the user device 108 over the public network 102, without any HTML rewrite. The same operations are performed in the reverse direction, i.e., from the user device 108 to the private server 110.

Figure 9:
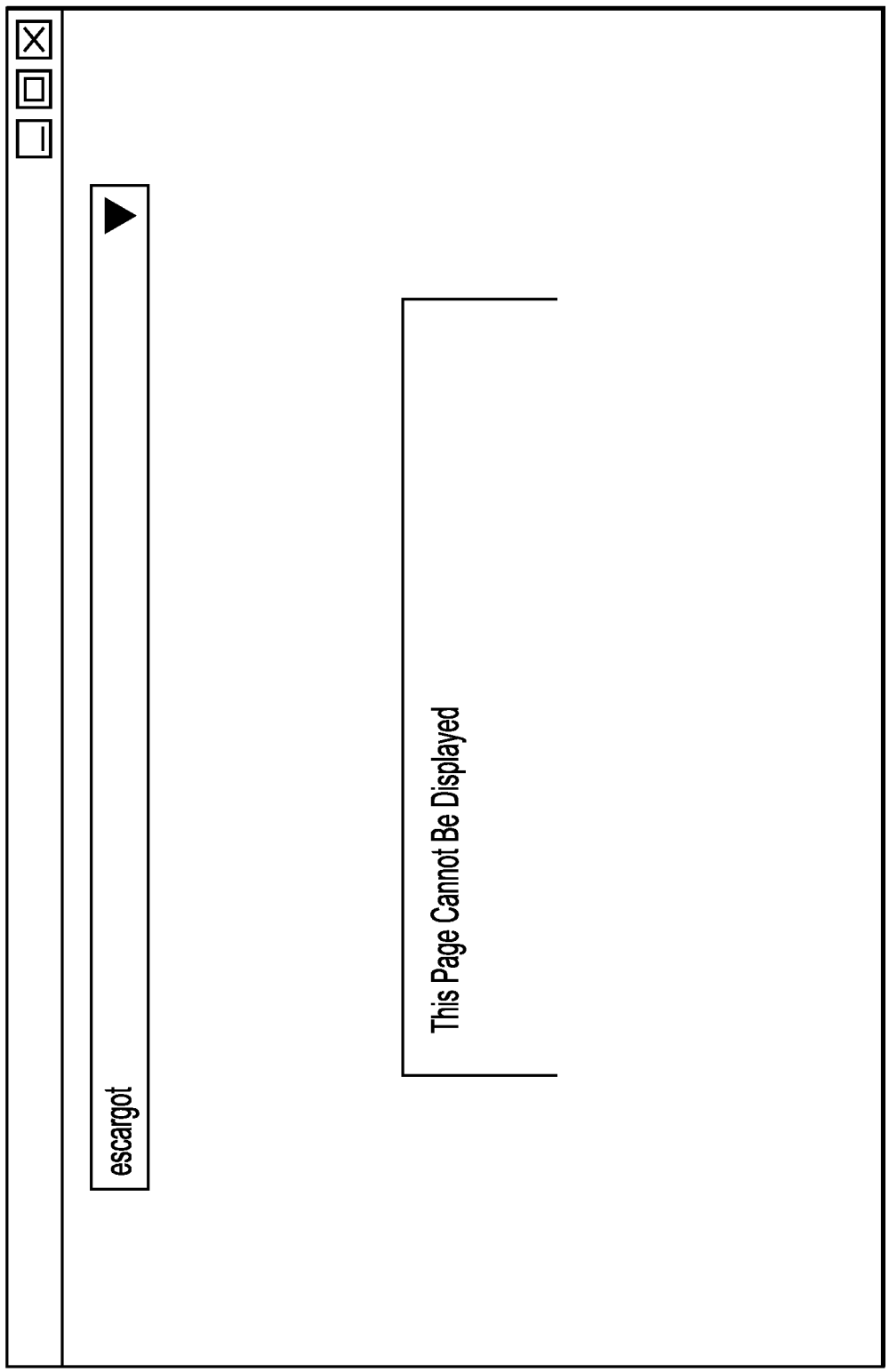
FIG. 9 is an illustration of a graphical user interface (GUI) presented by a web browser in a conventional clientless VPN solution.

With reference to FIG. 9, there is an illustration of a graphical user interface (GUI) presented by a web browser in a conventional clientless VPN solution. Responsive to receiving user input through the web browser requesting access to a private/internal resource "http://escargot," the web browser unsuccessfully attempts to access the private resource, e.g., open a VPN connection. The web browser presents the GUI shown in FIG. 9 indicating the failure.

Figure 10:
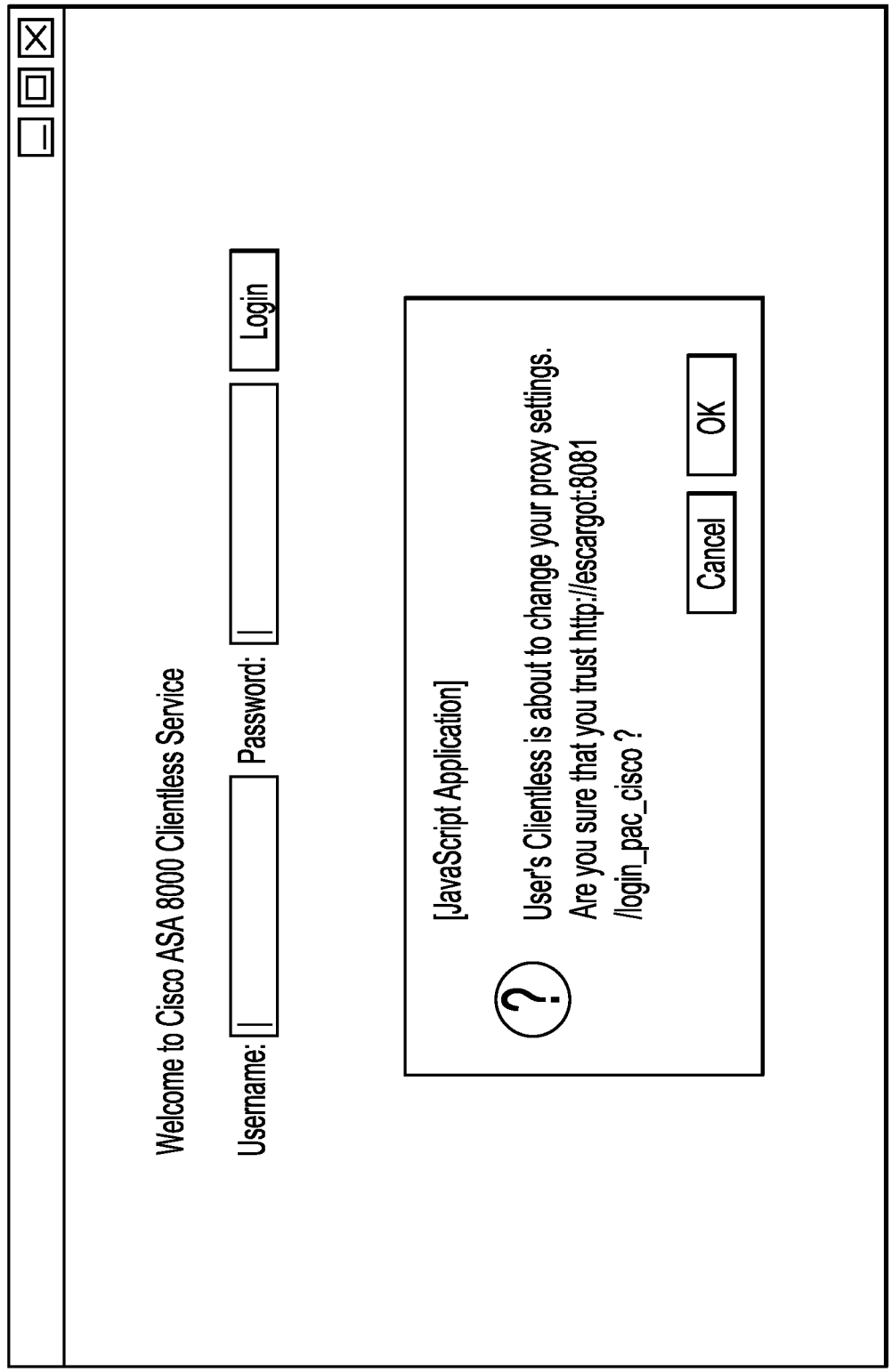
FIG. 10 is an illustration of an authentication GUI presented by the web browser in the clientless VPN and DNS-based resolution embodiments.

With reference to FIG. 10, there is an illustration of a GUI presented by the web browser 120 in the clientless VPN and DNS-based resolution embodiments presented herein. Responsive to receiving user input through the web browser 120 requesting access to the private resource "http://escargot," the web browser 120 performs operations described above to begin opening a secure connection to the private resource. In the process, the web browser 120 presents the GUI shown in FIG. 10 requesting user credentials for authentication, and prompting the user to accept a change in proxy settings to the URL "escargot," that will be made by the PAC. The GUI shown in FIG. 10 is an access portal based on DNS redirection. The PAC performs the redirect to the private network 104.

Figure 11:
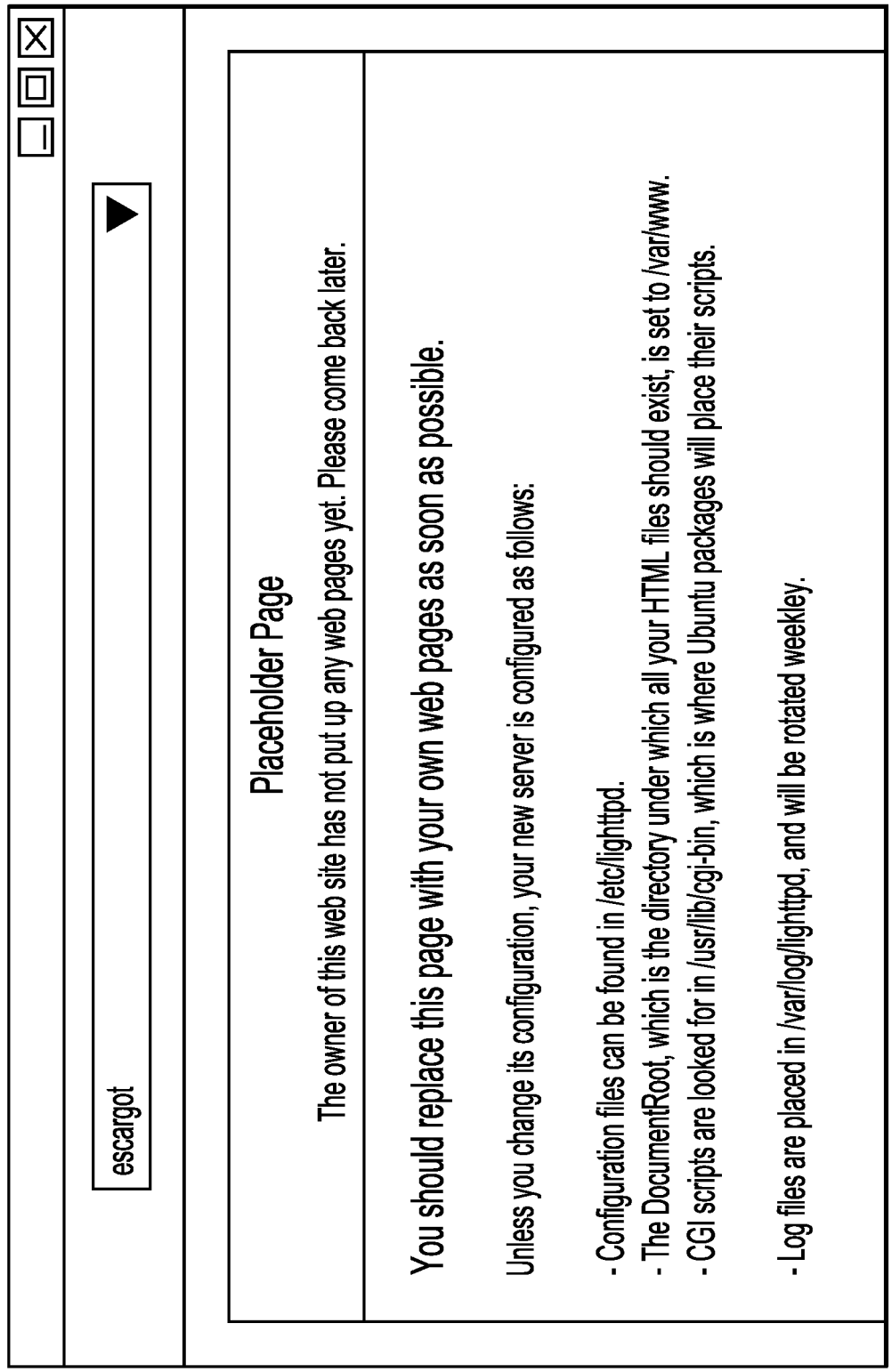
FIG. 11 is an illustration of a GUI presented by the web browser after the web browser has presented the GUI of FIG. 10, according to an example embodiment.

With reference to FIG. 11, there is an illustration of a GUI presented by the web browser 120 following the GUI of FIG. 10, assuming the user accepted the proxy redirect. The web browser 120 has been granted access to the private network 104, has requested a web page from the private network 104, received the web page, and presented the "internal" web page, as shown in FIG. 11. In other words, the proxy has been changed and the internal web page is displayed. As an end-result, the user is presented with internal webpages/resources of the private network 104 as if the user were logged into the private network 104 locally.

Figure 12:
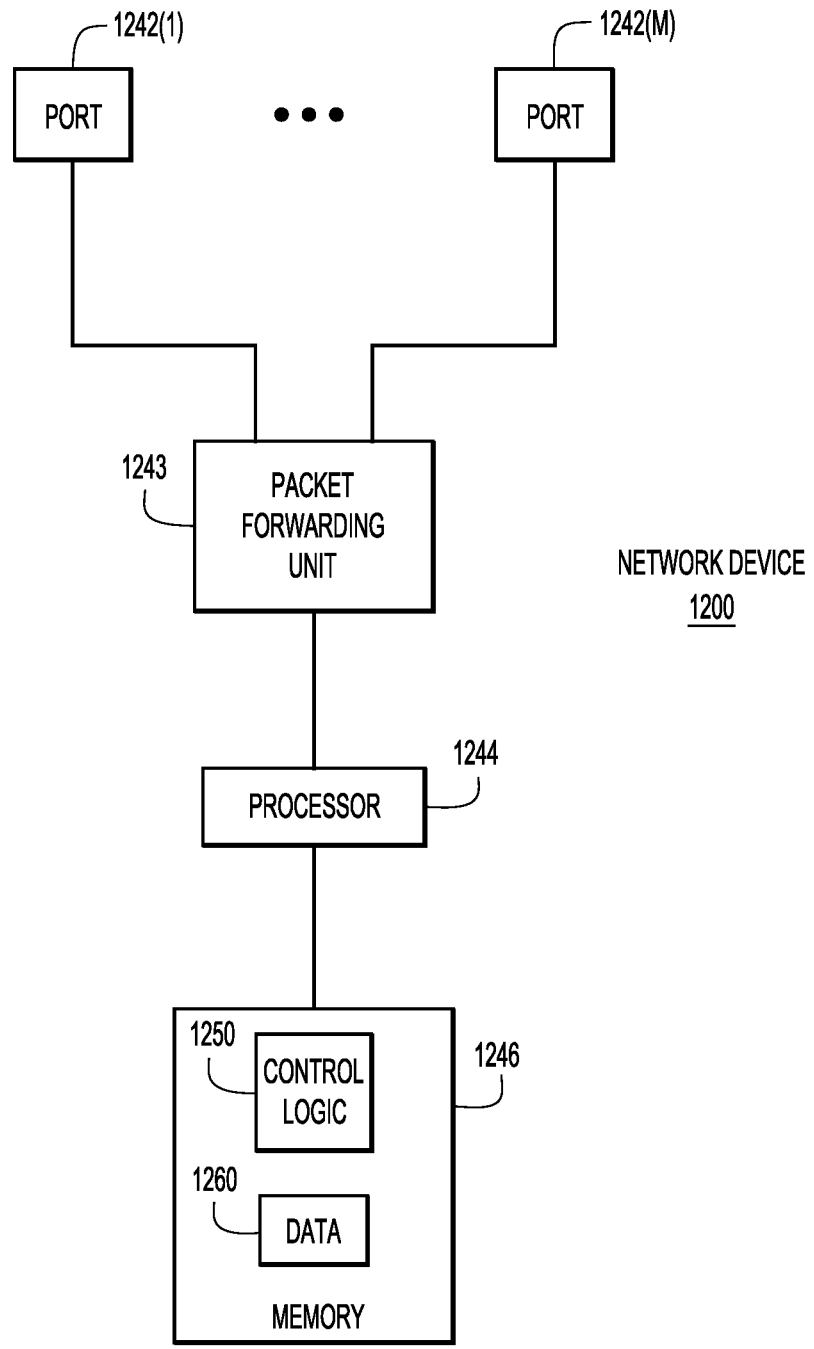
FIG. 12 is a block diagram of the security gateway, according to an example embodiment.

With reference to FIG. 12, there is a block diagram of an example network device 1200 representative of the security gateway 106. Network device 1200 comprises a network interface unit having multiple network input/output (I/O) ports 1242(1)-1242(M) to send traffic to one or more networks (e.g., the public network and the private network) and receive traffic from the networks, a packet forwarding/processing unit 1243, a network processor 1244 (also referred to simply as "processor"), and a memory 1246. The packet forwarding/processing unit 1243 is, for example, one or more application specific integrated circuits (ASICs) that include packet buffers, packet queues, and other control logic for performing packet forwarding operations. The processor 1244 may include multiple processors, which may be implemented as software or hardware processors. For example, processor 1244 may include a microcontroller or microprocessor that is configured to perform higher level controls of network device 1200. To this end, the memory 1246 stores software instructions that, when executed by the processor 1244, cause the processor 1244 to perform a variety of operations including operations described herein. For example, the memory 1246 stores instructions for control logic 1250 to perform operations described herein to implement the clientless VPN embodiments. Control logic 1250 may also include logic components in packet forwarding unit 1243. Memory 1246 also stores data 1260 used and generated by logic 1250, including PAC files and code snippets.

Figure 13:
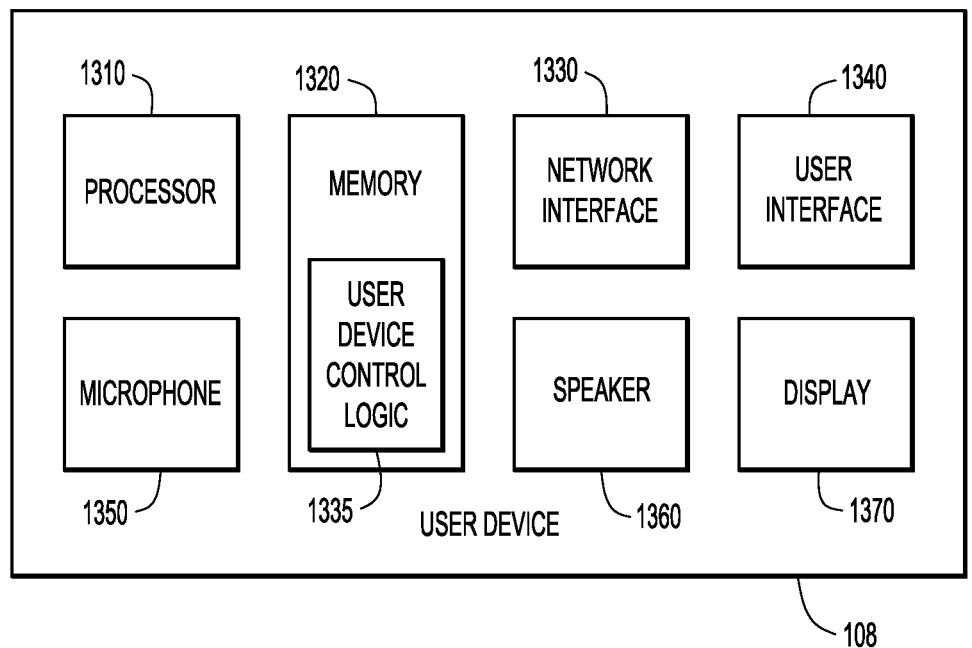
FIG. 13 is a block diagram of the user device, according to an embodiment.

Referring now to FIG. 13, a block diagram of the user device 108, according to an embodiment. The user device 108 includes a processor 1310 to process instructions for implementing user device operations, memory 1320 to store a variety of data and software instructions. The processor 1310 is, for example, a microprocessor or microcontroller that executes instructions of user device control logic 1335 in memory 1320 for implementing the processes described herein for the clientless VPN embodiments. The user device 108 also includes a network interface unit (e.g., card) 1330 to communicate with other devices over network 126. Network interface unit 1330 may include an Ethernet card with a port (or multiple such devices) to communicate over wired Ethernet links and/or a wireless communication card with a wireless transceiver to communicate over wireless links.

The user device 108 may further include a user interface unit 1340 to receive input from a user, microphone 1350 and loudspeaker 1360. The user interface unit 1340 may be in the form of a keyboard, mouse and/or a touchscreen user interface to allow for a user to interface with the user device 108. Microphone 1350 and loudspeaker 1360 enable audio to be recorded and output. The user device 108 may also comprise a display 1370, including, e.g., a touchscreen display, that can display data to a user.

Memory 1320 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1320 may comprise one or more tangible (non-transitory) computer readable storage media (e.g., a memory device) encoded with software (e.g., user device control logic/software 1335) comprising computer executable instructions and when the software is executed (by the processor 1310) it is operable to perform the operations described herein directed to the clientless VPN embodiments. Logic 1335 includes instructions to generate and display graphical user interfaces to present information on display 1370 and allow a user to provide input to the user device through, e.g., user selectable options of the graphical user interface. Logic 1335 includes the web browser 120 described above. Memory 1320 also stores data generated and used by user device 108 control logic 1335, such as the PAC file, the code snippet, and the web browser extension described above.

With reference to FIG. 14, there is a flowchart of a method 1400 of clientless VPN operation performed by security gateway 106. Method 1400 includes operations described above.

At 1402, responsive to a request (e.g., an open HTTP connection) from the web browser 120 over public network 102, the security gateway 106 establishes an initial, secure public connection to the web browser over the public network. The initial, secure public connection may be established using either option 1 or option 2 described above.

At 1404, over the initial, secure public connection, the security gateway 106 provisions the web browser 120 with (i) a PAC file configured to automatically redirect the web browser to the security gateway as a proxy server for clientless virtual private network (VPN) operation when the web browser browses any uniform resource locator including a particular domain name that encompasses private network 104, and (ii) a web browser extension (also referred to as a "PAC file interpreter") configured to install the PAC file and interpret the PAC file on behalf of the web browser. The security gateway 106 may provision the web browser 120 with the web browser extension directly (e.g., by sending the web browser extension to the web browser 120). Alternatively, the security gateway 106 may provision the web browser 120 with the web browser extension indirectly via a code snippet that the security gateway sends to the web browser. The code snippet is configured to, when executed on the web browser, cause the web browser to:
  a. Determine whether the web browser includes the web browser extension.
  b. If the web browser does not include the web browser extension, direct the web browser to fetch the web browser extension from a public network service (e.g., web browser extension database 510).
  c. If the web browser includes the web browser extension, not direct the web browser to download the web browser extension.

After the provisioning, the initial, secure public connection is closed.

At 1406, the security gateway 106 receives a request from the web browser 120 to access a private resource (e.g., private server 110) connected to private network 104. In response, the security gateway 106 (i) establishes a secure public connection to the web browser 120 over the public network 102 (e.g., the security gateway responds to/accepts an open HTTP connection from the web browser), (ii) establishes a private connection to the private resource over the private network 104, and (iii) associates the private connection with the secure public connection (e.g., by storing in memory a mapping between identifiers of the two connections) to form a secure, clientless VPN connection between the web browser and the private resource.

At 1408, acting as a transparent proxy server for the clientless VPN connection, the security gateway 106 forwards content from/to the private resource to/from the web browser 120 over the clientless VPN connection, without performing any content rewrite operations. That is, security gateway 106 bi-directionally forwards content between the private resource and web browser 120, without performing any content rewrite operations.

With reference to FIG. 15, there is a flowchart of a method 1500 of clientless VPN operation performed generally by user device 102 and, more specifically, by web browser 120. Method 1500 includes operations described above.

At 1502, the user device 108 sends to DNS service 114 a query including a URL for the security gateway 106 or a URL for a private resource hosted on private network 104.

At 1504, the user device 108 receive from DNS service 114 a response to the query. The response includes the IP address for the security gateway 106.

At 1506, the user device 108 opens a secure (public) connection to the security gateway 106 (the secure public connection may result from a redirect from the security gateway).

At 1508, the user device 108 receives provisioning information from the security gateway over the secure public connection. The provisioning information includes a PAC file and a code snippet, as described above. Then the user device 108 closes the secure public connection.

At 1510, the user device 108 sends to the security gateway 106 a request to connect with private resource.

At 1512, the user device 108 exchanges content with the private resource over a clientless VPN connection, via the security gateway 106, which acts as a clientless VPN proxy.

In summary, embodiments presented herein leverage and extend existing web browser capabilities to clientless VPN technology. The embodiments do not require VPN activation by a user or a thin VPN client. In the embodiments, clientless configuration deployment is ensured by a web browser plugin or a PAC file to identify a domain name specific proxy server that manages VPN connections. The browser plugin itself can be deployed using the web browser's plugin management system, simplifying both the user and administrative operations. Provisioning may be done manually by the administrator or using tools of choice (e.g. Mobile Device Management, and so on). The embodiments completely avoid HTML rewrite/mangling over the VPN connection between the web browser and private network.

In the embodiments, the web browser running on the computer connects to a proxy server running on-premise (or in a cloud). A connection to that proxy server may be made using Secure Sockets Layer (SSL) to assure data protection and integrity. Authentication to proxy server can be done using multiple mechanisms:
 a. Username/Password (standard credentials).
 b. Certificates.
 c. Password-authenticated key agreement.

For provisioning of the proxy, the proxy can be configured manually or in automated way (e.g., configuration pushed from GPO). Also, provisioning may be according to the following 2 methods: DNS provisioning initiated via option 1 above, or on-premise provisioning initiated via option 2 above. Both methods use plugins to web browsers.

In summary, in one aspect, a method is provided comprising: at a security gateway configured to communicate with a public network and a private network: provisioning, over the public network, a web browser hosted on a user device with a proxy auto-configuration file configured to automatically redirect the web browser to the security gateway as a proxy server for clientless virtual private network (VPN) operation when the web browser browses any uniform resource locator including a particular domain name that encompasses the private network; upon receiving from the web browser over the public network a request to access a private resource on the private network: establishing a secure public connection to the web browser over the public network; establishing a private connection to the private resource over the private network; and associating the private connection with the secure public connection to form a clientless VPN connection between the web browser and the private resource; and forwarding content from/to the private resource to/from the web browser over the clientless VPN connection without performing any content rewrite operations, i.e., forwarding content between the private resource and the web browser over the clientless VPN connection without performing any content rewrite operations.

In another aspect, an apparatus is provided comprising: multiple network ports configured to communicate with a public network and a private network; a processor coupled to the multiple network ports and configured to perform operations including: provisioning, over the public network, a web browser hosted on a user device with a proxy auto-configuration file configured to automatically redirect the web browser to the security gateway as a proxy server for clientless virtual private network (VPN) operation when the web browser browses any uniform resource locator including a particular domain name that encompasses the private network; upon receiving from the web browser over the public network a request to access a private resource on the private network: establishing a secure public connection to the web browser over the public network; establishing a private connection to the private resource over the private network; and associating the private connection with the secure public connection to form a clientless VPN connection between the web browser and the private resource; and forwarding content from/to the private resource to/from the web browser over the clientless VPN connection without performing any content rewrite operations, i.e., forwarding content between the private resource and the web browser over the clientless VPN connection without performing any content rewrite operations.

In yet another aspect, a non-transitory computer readable medium encoded with instructions is provided. The instructions, when executed by a processor of a security gateway configured to communicate with a public network and a private network, cause the processor to perform operations including: provisioning, over the public network, a web browser hosted on a user device with a proxy auto-configuration file configured to automatically redirect the web browser to the security gateway as a proxy server for clientless virtual private network (VPN) operation when the web browser browses any uniform resource locator including a particular domain name that encompasses the private network; upon receiving from the web browser over the public network a request to access a private resource on the private network: establishing a secure public connection to the web browser over the public network; establishing a private connection to the private resource over the private network; and associating the private connection with the secure public connection to form a clientless VPN connection between the web browser and the private resource; and forwarding content from/to the private resource to/from the web browser over the clientless VPN connection without performing any content rewrite operations, i.e., forwarding content between the private resource and the web browser over the clientless VPN connection without performing any content rewrite operations.

In a further aspect, a method performed at a web browser hosted on a user device configured to communicate with a public network is provided. The method comprises: opening an initial connection to the security gateway over the public network; receiving from the security gateway over the initial connection provisioning information including a PAC file to assist the web browser with forming a clientless VPN connection; and after closing the initial connection, upon browsing any URL, executing the PAC file, the executing causing the web browser to perform: determining whether the URL includes a domain name that matches a particular domain name encompassing a private network accessible via the security gateway; if the domain name matches the particular domain name, redirecting the web browser to the security gateway as a proxy server for the clientless VPN connection; and if the domain name does not match the particular domain name, not redirecting to the security gateway.

The method performed at the web browser may further comprise, following the redirecting the web browser to the security gateway: establishing, via the security gateway over the public network, the clientless VPN connection to a private resource connected to the private network and over which the web browser is able to access the private resource.

In the method performed at the web browser, the receiving includes receiving the provisioning information to include a code snippet configured to, when executed on the web browser, ensure the web browser includes a web browser extension configured to interpret the PAC file on behalf of the web browser, and the method further comprises executing the code snippet.

In the method performed at the web browser, the executing the code snippet may cause the web browser to perform: determining whether the web browser includes the web browser extension; if the web browser does not include the web browser extension, fetching the web browser extension from a web browser extension database, and installing the web browser extension on the web browser; and if the web browser includes the web browser extension, not fetching the web browser extension.

The method performed at the web browser may further comprise, prior to opening the initial connection, upon browsing an initial URL for either a private resource hosted on the private network or for the security gateway, sending to a public DNS service a query including the initial URL, receiving from the public DNS service a response to the query, the response including an IP address for the security gateway, wherein the opening the initial connection includes opening the initial connection to the IP address of the security gateway.

In an even further aspect, an apparatus, such as a user device, configured to host the web browser (that performs the above-described method performed at the web browser) is provided.

In yet another aspect, a non-transitory computer readable medium encoded with instructions is provided. The instructions, when executed by a processor of a user device, cause the user device to implement a web browser configured to communicate with a public network, cause the web browser to perform the web browser methods described above.

The above description is intended by way of example only.

What is claimed is:
1. A method comprising:
at a security gateway configured to communicate with a public network and a private network:
provisioning, over the public network, a web browser hosted on a user device with a proxy auto-configuration file configured to automatically redirect the web browser to the security gateway as a proxy server for clientless virtual private network (VPN) operation when the web browser browses any uniform resource locator including a particular domain name that encompasses the private network;
upon receiving from the web browser over the public network a request to access a private resource on the private network:
establishing a secure public connection to the web browser over the public network;
establishing a private connection to the private resource over the private network; and
associating the private connection with the secure public connection to form a clientless VPN connection between the web browser and the private resource; and
forwarding content between the private resource and the web browser over the clientless VPN connection without performing any content rewrite operations.

2. The method of claim 1, wherein the provisioning the web browser further includes provisioning the web browser with a web browser extension configured to interpret the proxy auto-configuration file on behalf of the web browser.

3. The method of claim 2, wherein the provisioning the web browser with the web browser extension includes sending to the web browser a code snippet that is configured to, when executed on the web browser, cause the web browser to:
determine whether the web browser includes the web browser extension;
if the web browser does not include the web browser extension, direct the web browser to fetch the web browser extension from a web browser extension database; and
if the web browser includes the web browser extension, not direct the web browser to fetch the web browser extension.

4. The method of claim 3, further comprising, at the web browser:
receiving the code snippet from the security gateway; and
executing the code snippet to:
determine whether the web browser includes the web browser extension;
if the web browser does not include the web browser extension, fetch the web browser extension from the web browser extension database; and
if the web browser includes the web browser extension, not fetch the web browser extension.

5. The method of claim 1, wherein the forwarding the content includes forwarding Hypertext Transfer Markup Language (HTML) or JavaScript web content without performing any HTML or JavaScript rewrite operations.

6. The method of claim 1, wherein:
the provisioning includes provisioning the web browser over a Hypertext Transfer Protocol Secure (HTTPS) connection between the web browser and the security gateway; and
the establishing the secure public connection includes establishing the secure public connection as an HTTPS connection.

7. The method of claim 1, further comprising:
prior to the provisioning, establishing an initial public connection to the web browser,
wherein the provisioning includes provisioning the web browser over the initial public connection.

8. The method of claim 7, wherein the establishing the initial public connection includes:
upon receiving from the web browser a request to open a connection, sending to the web browser a redirect command to force the web browser into a secure public connection as the initial public connection.

9. The method of claim 7, further comprising, at the web browser:
prior to the establishing the initial public connection:
upon browsing a uniform resource locator (URL) directed to the security gateway, sending to a public domain name system (DNS) service a query including the URL; and
receiving from the public DNS service a response to the query, the response including an Internet Protocol (IP) address of the security gateway;
sending to the IP address of the security gateway a request to open the initial public connection; and receiving provisioning information from the security gateway over the initial public connection.

10. The method of claim 1, further comprising, at the web browser:
receiving the proxy auto-configuration file from the security gateway; and
upon browsing a uniform resource locator (URL), executing the proxy auto-configuration file to:
determine whether the URL includes a domain name that matches the particular domain name;
if the domain name matches the particular domain name, redirect to the security gateway; and
if the domain name does not match the particular domain name, not redirect to the security gateway.

11. An apparatus comprising:
multiple network ports configured to communicate with a public network and a private network;
a processor implemented in hardware and coupled to the multiple network ports, the processor configured to perform operations including:
provisioning, over the public network, a web browser hosted on a user device with a proxy auto-configuration file configured to automatically redirect the web browser to a security gateway as a proxy server for clientless virtual private network (VPN) operation when the web browser browses any uniform resource locator including a particular domain name that encompasses the private network;
upon receiving from the web browser over the public network a request to access a private resource on the private network:
establishing a secure public connection to the web browser over the public network;
establishing a private connection to the private resource over the private network; and
associating the private connection with the secure public connection to form a clientless VPN connection between the web browser and the private resource; and
forwarding content between the private resource and the web browser over the clientless VPN connection without performing any content rewrite operations.

12. The apparatus of claim 11, wherein the provisioning the web browser further includes provisioning the web browser with a web browser extension configured to interpret the proxy auto-configuration file on behalf of the web browser.

13. The apparatus of claim 12, wherein the provisioning the web browser with the web browser extension includes sending to the web browser a code snippet that is configured to, when executed on the web browser, cause the web browser to:
determine whether the web browser includes the web browser extension;
if the web browser does not include the web browser extension, direct the web browser to fetch the web browser extension from a web browser extension database; and
if the web browser includes the web browser extension, not direct the web browser to fetch the web browser extension.

14. The apparatus of claim 11, wherein the forwarding the content includes forwarding Hypertext Transfer Markup Language (HTML) or JavaScript web content without performing any HTML or JavaScript rewrite operations.

15. The apparatus of claim 11, wherein:
the provisioning includes provisioning the web browser over a Hypertext Transfer Protocol Secure (HTTPS) connection between the web browser and the security gateway; and
the establishing the secure public connection includes establishing the secure public connection as an HTTPS connection.

16. The apparatus of claim 11, wherein the processor is further configured to perform:
prior to performing the provisioning, establishing an initial public connection to the web browser,
wherein the provisioning includes provisioning the web browser over the initial public connection.

17. The apparatus of claim 16, wherein the establishing the initial public connection includes:
upon receiving from the web browser a request to open a connection, sending to the web browser a redirect command to force the web browser into a secure public connection as the initial public connection.

18. A non-transitory computer readable medium encoded with instructions that, when executed by a processor of a security gateway configured to communicate with a public network and a private network, cause the processor to perform operations including:
provisioning, over the public network, a web browser hosted on a user device with a proxy auto-configuration file configured to automatically redirect the web browser to the security gateway as a proxy server for clientless virtual private network (VPN) operation when the web browser browses any uniform resource locator including a particular domain name that encompasses the private network;
upon receiving from the web browser over the public network a request to access a private resource on the private network:
establishing a secure public connection to the web browser over the public network;
establishing a private connection to the private resource over the private network; and
associating the private connection with the secure public connection to form a clientless VPN connection between the web browser and the private resource; and
forwarding content between the private resource and the web browser over the clientless VPN connection without performing any content rewrite operations.

19. The non-transitory computer readable medium of claim 18, wherein the instructions to cause the processor to perform the provisioning the web browser further include instructions to cause the processor to perform provisioning the web browser with a web browser extension configured to interpret the proxy auto-configuration file on behalf of the web browser.

20. The non-transitory computer readable medium of claim 19, wherein the instructions to cause the processor to perform the provisioning the web browser with the web browser extension include instructions to cause the processor to perform sending to the web browser a code snippet that is configured to, when executed on the web browser, cause the web browser to:
determine whether the web browser includes the web browser extension;

if the web browser does not include the web browser extension, direct the web browser to fetch the web browser extension from a web browser extension database; and if the web browser includes the web browser extension, not direct the web browser to fetch the web browser extension.

\* \* \* \* \*